US009645981B1

(12) United States Patent
Buisman et al.

(10) Patent No.: US 9,645,981 B1
(45) Date of Patent: May 9, 2017

(54) EXTRACTION OF BUSINESS-RELEVANT IMAGE CONTENT FROM THE WEB

(71) Applicant: Google Inc., Mountain View, CA (US)

(72) Inventors: Hylke Niekele Buisman, Zurich (CH); Daniel Cotting, Islisberg (CH); Avni Shah, Los Altos, CA (US); Elizabeth Reid, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 327 days.

(21) Appl. No.: 13/745,719

(22) Filed: Jan. 18, 2013

Related U.S. Application Data

(60) Provisional application No. 61/715,210, filed on Oct. 17, 2012.

(51) Int. Cl.
G06F 17/00 (2006.01)
G06F 17/22 (2006.01)

(52) U.S. Cl.
CPC ................................ G06F 17/2247 (2013.01)

(58) Field of Classification Search
None
See application file for complete search history.

(56) References Cited

U.S. PATENT DOCUMENTS

| 2003/0046311 A1* | 3/2003 | Baidya .............. G06F 17/30873 |
| 2007/0192164 A1* | 8/2007 | Nong et al. ..................... 705/10 |
| 2009/0154795 A1* | 6/2009 | Tan ....................... G06K 9/6215 382/155 |
| 2010/0309225 A1* | 12/2010 | Gray et al. .................... 345/633 |
| 2011/0313779 A1* | 12/2011 | Herzog et al. ................. 705/1.1 |
| 2012/0039539 A1* | 2/2012 | Boiman ................. G11B 27/28 382/195 |
| 2013/0124626 A1* | 5/2013 | Cathcart et al. .............. 709/204 |

OTHER PUBLICATIONS

Eldon, Eric: Facebook Asks Page Owners to Prove Authenticity, published Oct. 12, 2009 at http://www.adweek.com/socialtimes/facebook-asks-page-owners-to-prove-authenticity/229508.*

* cited by examiner

Primary Examiner — Keith Bloomquist
(74) Attorney, Agent, or Firm — Lerner, David, Littenberg, Krumholz & Mentlik, LLP

(57) ABSTRACT

A system and machine-implemented method for providing image content corresponding to a business establishment is provided. Several webpages corresponding to a business establishment are received, and one or more webpages are selected from the several webpages, based on the content of each of the several webpages. At least one webpage related to the selected one or more webpages is retrieved. Image content is extracted from the retrieved at least one webpage. At least one annotation is generated for the extracted image content based on at least one characteristic of the extracted image content. The image content is filtered based on the generated at least one annotation for the extracted image content. The filtered image content is provided for display.

17 Claims, 5 Drawing Sheets

EXTRACTION OF BUSINESS-RELEVANT IMAGE CONTENT FROM THE WEB

CROSS-REFERENCES TO RELATED APPLICATIONS

The present application claims the benefit of U.S. Provisional Patent Application No. 61/715,210, entitled "Extraction of Business-Relevant Image Content from the Web," filed on Oct. 17, 2012, which is hereby incorporated by reference in its entirety for all purposes.

BACKGROUND

The present disclosure generally relates to extracting image content, and, in particular, to extracting image content related to business establishments.

The use of place-relevant image content has become popular in online applications. For example, when a user enters a business establishment in a search query, the returned results may include, in addition to a variety of related hyperlinks, a business listing (e.g., with an address, phone number, URL to an official webpage, etc.), a map of the area of the business establishment, and images related to the business establishment. The images provided may be extracted from a variety of sources including but not limited to the business establishment's website. The extracted images of the business establishments, however, may not properly represent the business establishments in some instances.

SUMMARY

The disclosed subject matter relates to a machine-implemented method for providing image content corresponding to a business establishment. Several webpages corresponding to a business establishment are received, and one or more webpages are selected from the several webpages, based on the content of each of the several webpages. At least one webpage related to the selected one or more webpages is retrieved. Image content is extracted from the retrieved at least one webpage. At least one annotation is generated for the extracted image content based on at least one characteristic of the extracted image content. The image content is filtered based on the generated at least one annotation for the extracted image content. The filtered image content is provided for display.

The disclosed subject matter also relates to a machine-readable medium comprising instructions stored therein, which when executed by a system, cause the system to perform operations comprising identifying a domain corresponding to a business establishment. At least one webpage related to the identified domain is retrieved, and image content is extracted from the retrieved at least one webpage, the extracted image content including image files. At least one annotation is generated for the image files based on at least one characteristic of the image files. Scores are determined for the image files based on the generated at least one annotation. The image files are filtered based on the determined scores of the image files. The filtered image files are provided for display.

According to various aspects of the subject technology, a system for extracting business-relevant image content from the web is provided. The system includes one or more processors and a machine-readable medium comprising instructions stored therein, which when executed by the processors, cause the processors to perform operations comprising identifying a domain corresponding to a business establishment. At least one webpage related to the identified domain is retrieved. Image content is extracted from the retrieved at least one webpage, where the extracted image content includes image files. At least one annotation is generated for the image files based on at least one characteristic of the image files. Scores for the image files are determined based on the generated at least one annotation. The image files are sorted based on the determined scores of the image files. A set of the image files are provided for display based on the sorting of the image files.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

The disclosed subject matter provides for extracting business-relevant image content from the web. More particularly, the image content is extracted based on the relevance of the image content to the business establishment for which it is extracted. A set of webpages corresponding to a business establishment may be received and analyzed for image content included in the webpages. Certain webpages may be selected from the set based on the analysis. A webpage related to the selected webpages may be retrieved, and from this webpage, image content may be extracted. Annotations may be generated for the extracted image content based on different characteristics of the extracted image content in order to determine the appropriateness of the extracted image content.

The generated annotations may provide information on different characteristics of the image content such as a probability that the extracted image content contains obscene material, a probability that the extracted image content is a photograph versus a graphical rendering, or whether the extracted image content is black and white or color. Images that are determined as having a high likelihood of being obscene material are generally filtered out. Similarly, photographs are favored over graphical renderings, and color images are favored over black and white images. The image content may be filtered based on such preferences. The filtered image content is then provided for display.

Figure 1:
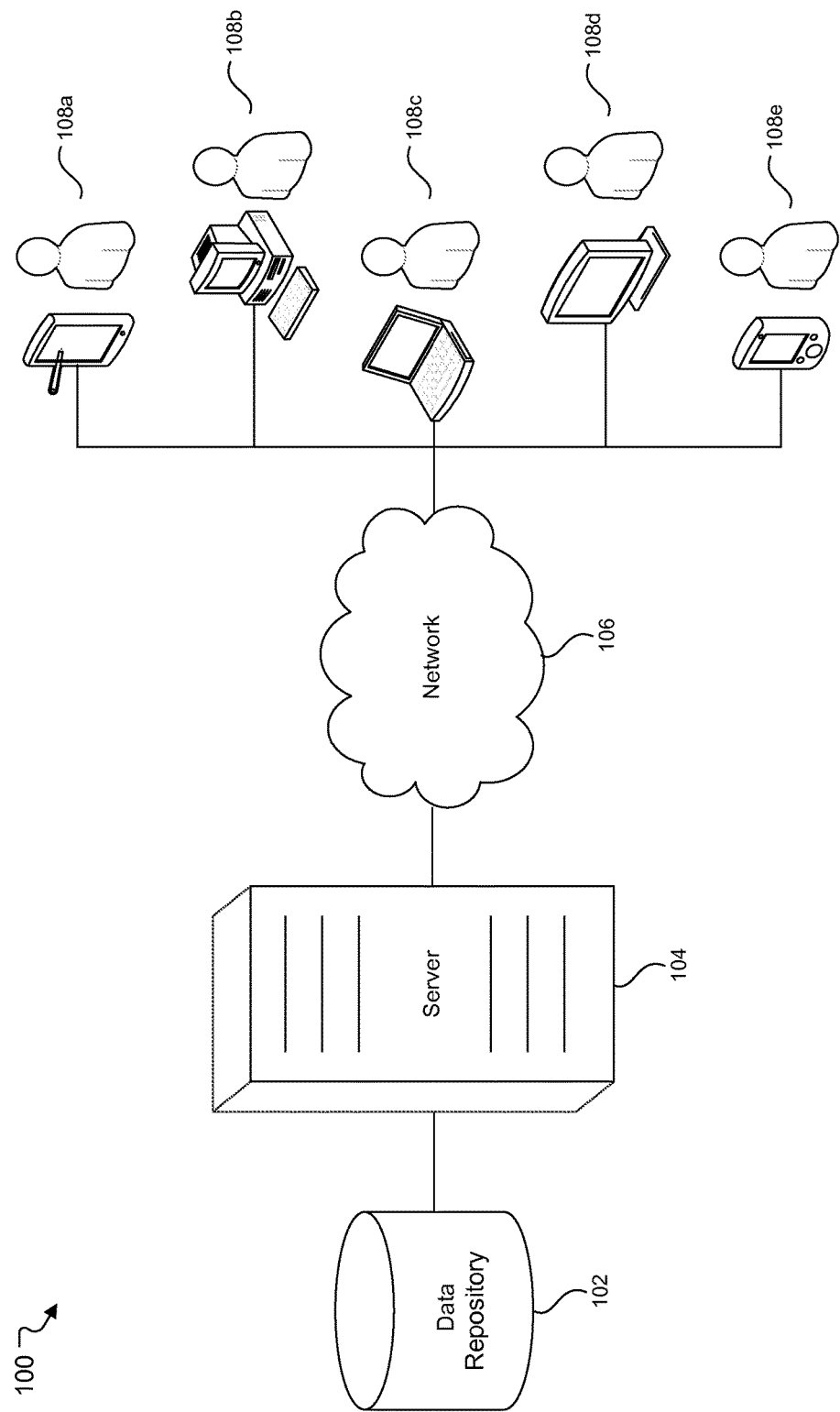
FIG. 1 illustrates an example network environment which provides for extracting business-relevant image content from the web.

FIG. 1 illustrates an example network environment which provides for extracting business-relevant image content from the web. Network environment 100 includes a data repository 102 (e.g., computer-readable storage media) for storing a variety of data accessible by web-based applications. While the network environment 100 includes a single data repository 102 in FIG. 1, the network environment may include additional data repositories in some implementations. Data repository 102 may store, for example, webpages related to different business establishments, including image files associated with the business establishment's webpage.

Network environment 100 further includes server 104. While the network environment 100 includes a single server in FIG. 1, the network environment may include several interconnected servers in some implementations. Server 104 may populate image content corresponding to different business establishments. Server 104 and client devices 108a-108e may be communicatively coupled through a network 106. In some implementations, client devices 108a-108e may request data from server 104. For example, client devices 108a-108e may enter a business establishment name into a search query, for which server 104 retrieves and serves the result.

Each of client devices 108a-108e represents various forms of processing devices. Examples of a processing device include a desktop computer, a laptop computer, a handheld computer, a television coupled to a processor or having a processor embedded therein, a personal digital assistant (PDA), a network appliance, a camera, a smart phone, a media player, a navigation device, an email device, a game console, or a combination of any these data processing devices or other data processing devices.

Each of client devices 108a-108e may be any system or device having a processor, a memory, and communications capability for providing content to the electronic devices. In some example aspects, server 104 can be a single computing device, for example, a computer server. In other embodiments, server 104 can represent more than one computing device working together to perform the actions of a server computer (e.g., cloud computing). Further, each of client devices 108a-108e can represent various forms of servers including, but not limited to a web server, an application server, a proxy server, a network server, or a server farm.

In some aspects, client devices 108a-108e may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

In some aspects, network environment 100 can be a distributed client/server system that spans one or more networks such as network 106. Network 106 can be a large computer network, including a local area network (LAN), wide area network (WAN), the Internet, a cellular network, or a combination thereof connecting any number of mobile clients, fixed clients, and servers. In some aspects, each client (e.g., client devices 108a-108e) can communicate with servers 104 via a virtual private network (VPN), Secure Shell (SSH) tunnel, or other secure network connection. In some aspects, network 106 may further include a corporate network (e.g., intranet) and one or more wireless access points.

In example aspects, server 104 may process image content related to a business establishment. For example, server 104 may retrieve image content from a variety of webpages and filter the image content based on a variety of characteristics. Server 104 may then store the image content in data repository 102. When server 104 receives a query request for which the business establishment is returned as a result, server 104 may retrieve a set of data (e.g., hyperlinks, address data, image content, etc.) from data repository 102 and serve the set of data for display as search results on client devices 108a-108e. The image content served by server 104 may be image content that server 104 processed for the business establishment and stored on data repository 102.

Figure 2:
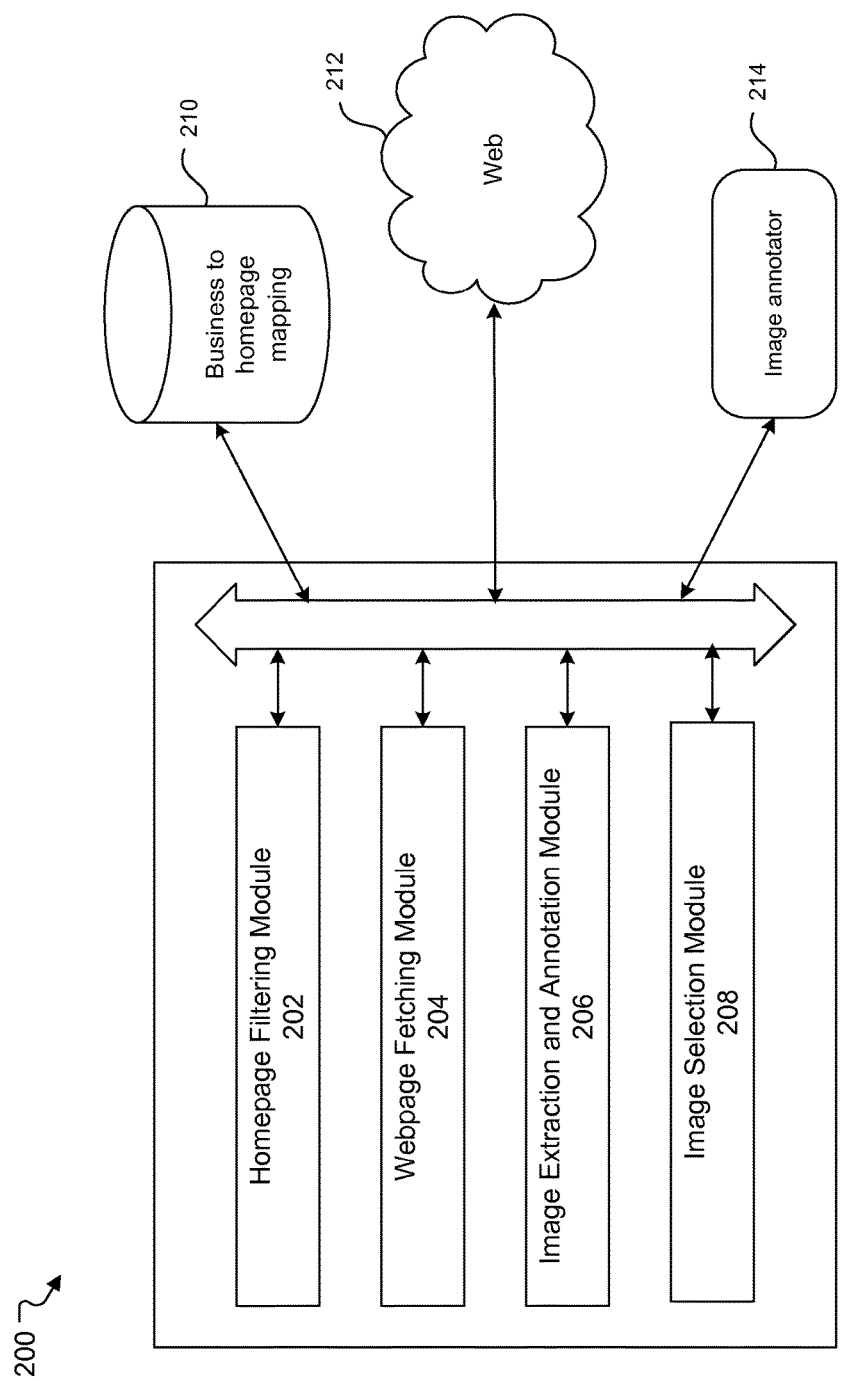
FIG. 2 illustrates an example of a server system for extracting business-relevant image content from the web.

FIG. 2 illustrates an example of a system for extracting business-relevant image content from the web. System 200 includes homepage filtering module 202, webpage fetching module 204, image extraction and annotation module 206, and image selection module 208. These modules, which are in communication with one another, process information retrieved from data repositories, which may include business to home page mapping storage 210 in order to extract business-relevant image content from the web. For example, when image content is to be extracted for a business establishment, homepage filtering module 202 may determine, based on the information available in business to home page mapping storage 210, the appropriate webpages from which to extract the image content. Once determined, webpage fetching module 204 may then identify additional webpages related to those webpage determined to be appropriate for extracting image content. For example, the additional webpages may represent pages within the same domain as those determined to appropriate for extracting image content. These webpages may be fetched directly from the web 212.

Image extraction and annotation module 206 may extract image content from the webpages that have been fetched. Image content may be identified based on file type, such as by looking for extensions associated with image content (e.g., .gif, .jpg, .png, etc.). An annotation is then generated for the extracted image to quantify different qualities of the image content. In some aspects, the annotation is generated externally by image annotator 214. Once the annotation has been generated, the results of the annotation are used as a basis for selection of the image content. Image selection module 208 selects the image content to be provided for display based on the annotation.

In some aspects, the modules may be implemented in software (e.g., subroutines and code). The software implementation of the modules may operate on server 104. In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
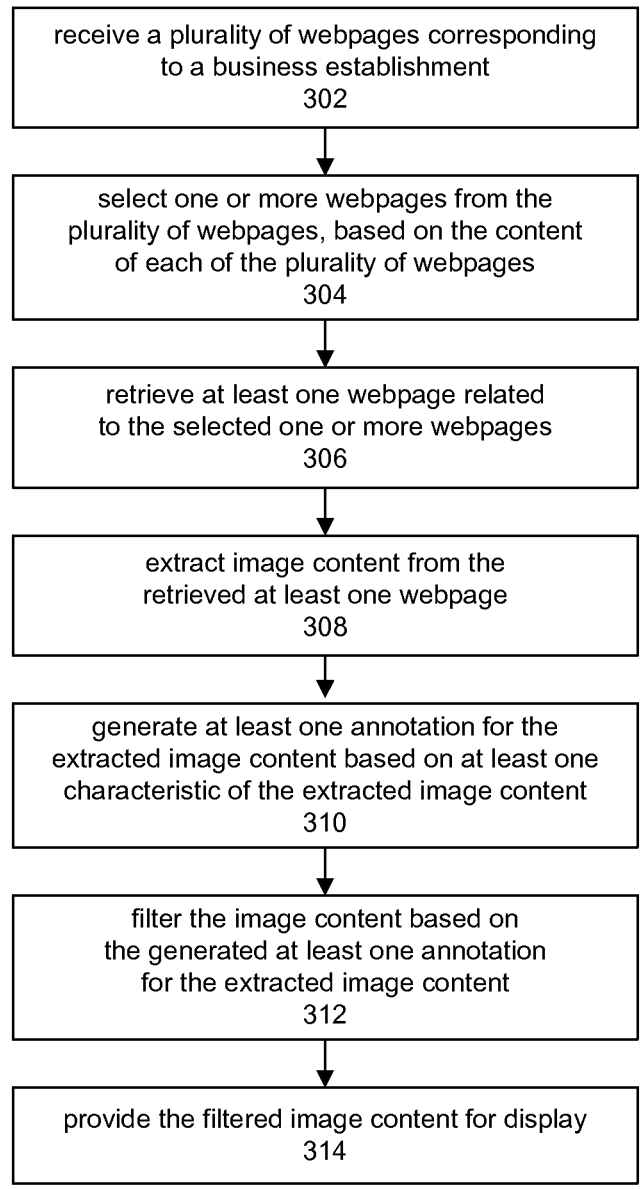
FIG. 3 illustrates an example method for extracting business-relevant image content from the web.

FIG. 3 illustrates example method 300 for extracting business-relevant image content from the web. In block 302, webpages corresponding to a business establishment are received. The webpages may be received based on a business to homepage mapping provided by a server. For example, a web index produced by a web crawl may identify to a degree of certainty that a webpage belongs to and is administered by a particular business establishment. In some aspects, only those webpages that are identified to a degree of certainty (e.g., a probability of being correct) above a predetermined threshold level are received as a webpage corresponding to a business establishment. Alternatively, a business establishment may also provide information that identifies a particular webpage as belonging to and being administered by the business establishment. Thus, the webpage corresponding to the business establishment may be received based on the information provided directly from the business establishment.

In block 304, one or more webpages are selected from the webpages, based on the content of each of the webpages. While certain webpages may correspond to a particular business establishment, other webpages for a business establishment may represent an entire chain with multiple locations. Thus, image content provided by those webpages may not be representative of the particular location for which a user seeks information (e.g., via a search query). For example, a national chain business establishment may have a generic website that includes stock photos. These photos, however, may not be representative of a local franchise of the business establishment. Thus, only certain webpages are selected from the several webpages corresponding to the business establishments. That is, webpages such as those that relate to a central website of a multiple location chain type business establishment may be omitted from being selected.

In block 306, at least one webpage related to the selected one or more webpages is retrieved. For each of the selected webpages, there may be multiple additional webpages within the same domain from which image content may be extracted. For example, the home webpage of a business establishment may provide several hyperlinks to other webpages under the same domain of the business establishment for a user to view. These additional webpages may include image content, and are thus retrieved. In some implementations, webpages under the same domain and with path names that include certain indicator terms such (e.g., gallery, photo, pictures, etc.) may be identified and selected. These indicator terms may suggest that image content is available at a particular path. Additionally, webpages may be retrieved based on the number of clicks required to arrive at the webpage from the root page of the domain. For example, the higher the number of required clicks to arrive at the webpage from the root page of the domain, the less likely that the image content on that webpage is particularly relevant. The number of clicks may be determined based on a web index.

Once the webpages are retrieved, image content is extracted from the retrieved webpages in block 308. Image content on the retrieved webpages may be identified based on file type, such as by looking for extensions associated with image content (e.g., .gif, .jpg, .png, etc.). At least one annotation is generated for the extracted image content in block 310. The annotations may be generated based on characteristics of the extracted image content. In some aspects, the generated annotations may provide information on different characteristics of the image content such as a probability that the extracted image content contains obscene material (e.g., pornography), a probability that the extracted image content is a photograph versus a graphical rendering, an indication of whether the extracted image content is black and white or color, or an indication of a relevance of a Uniform Resource Locator (URL) of the retrieved at least one webpage.

Once the annotations are generated, the image content is filtered based on the annotation for the extracted image content in block 312. For example, images that are determined as having a high likelihood of being obscene material may be filtered out. Similarly, photographs may be favored over graphical renderings, and color images may be favored over black and white images. In some aspects, the annotations may be generated externally. For example, the probability that the image content contains obscene material may be determined by an external system that provides a value that represents the probability that the image content contains obscene material. Similarly, features of the image content may be analyzed by an external system to determine whether the image content is a photograph versus a graphical rendering, and whether the extracted image content is black and white or color. Additionally, the indication of the relevance of the URL related to the retrieved at least one webpage may be determined based on the text in the URL. For example, and path name ending in "/gallery.html" or "/pictures.html" may be indicated as being more relevant than "/news.html", as the former two path names suggest that image content may be included.

In some implementations, the generated annotations may provide information on additional characteristics of the image content such as physical dimensions of the image content. For example, an image with larger physical dimensions may be preferred over an image with smaller physical dimensions, since larger physical dimensions provide higher resolution images. Furthermore, an aspect ratio of the image content may also contribute to the generated annotations. The aspect ratio may provide an indication of whether the image content corresponds to a banner of a webpage. Image content with aspect ratios where the width is significantly larger in value than the height may provide an indication that the image content corresponds to a banner, and thus it may be advantageous to filter out such image content since banners on webpages are not considered useful image content related to a business establishment.

In some aspects, the generated annotations may used to produce a score for each image file of the image content. For example, a score may be assigned based on each of the different characteristics. The scores may then be combined to produce a single score for each image file. In some implementations, weights may be assigned to each of the different characteristics. The weights may be used to emphasize the importance of a particular score over other scores from which the single score is calculated. For example, if the probability of obscene material is to be emphasized, then that particular characteristic will have a higher weight as compared to the other characteristics.

Once the scores for each image file of the image content has been calculated, a filter may be applied. In some aspects, the image files may be sorted based on the scores, and a top predetermined number of image files (e.g., top 20 images files) are kept with the remainder being filtered out. Alternatively, all image files with a score higher than a predetermined threshold level may me maintained, and the remainder of the images being filtered out. Once filtered, the image content may be provided for display in block 314. In some aspects, the filtered image content may be provided to one of several pipelines into which image content is provided. The pipeline of image content may be further processed before certain image files of the image content are associated with a business establishment. Once associated, the image files may be provided along with other images of the business establishment. For example, when a user enters a business establishment in a search query, the returned results may include, in addition to a variety of related hyperlinks, a business listing (e.g., with an address, phone number, URL to an official webpage, etc.), a map of the area of the business establishment, and images related to the business establishment.

In some aspects, the image content may be provided as actual image files (e.g., jpeg, tiff, gif, bmp, png, etc.). The image files provided may then be stored on a local server for future access. Alternatively, the image content may be provided as links to files stored on one or more servers. For example, the links may include a web addresses corresponding to the locations of the image content from which the image content may be accessed. The images may be provided, in one example, as part of a local business information document (e.g., a webpage or other document provided in response to a request made by a user device to a map service provider, search engine, social network, etc.). The business information document can include other data (e.g., telephone number, a map, reviews, etc.) provided by the users, the business itself, and/or may be collected elsewhere.

Figure 4:
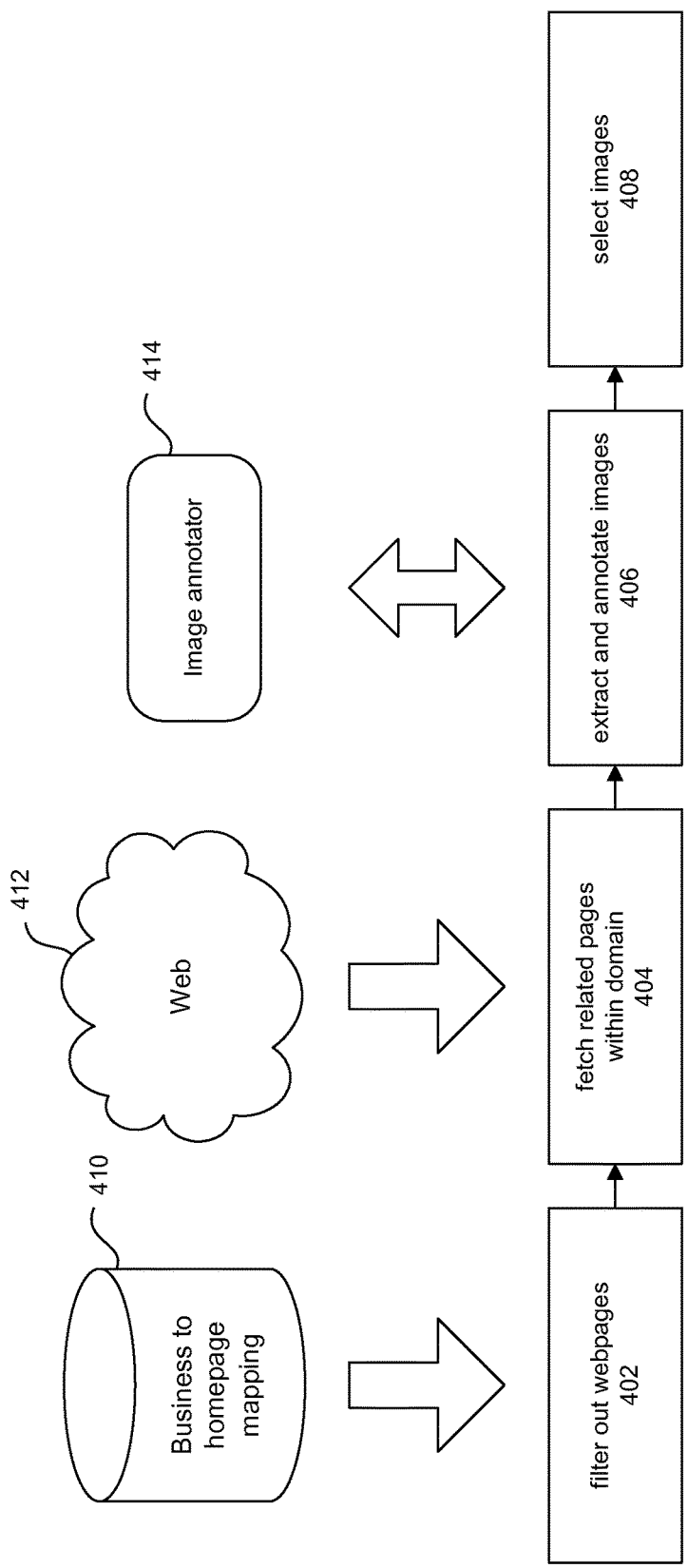
FIG. 4 illustrates an example process for extracting business-relevant image content from the web.

FIG. 4 illustrates an example process for extracting business-relevant image content from the web. In step 402, homepages corresponding to a business are filtered in order to eliminate homepages that are unlikely to contain high quality and relevant images. For example, the homepage of a chain restaurant may provide stock image content of the business, but is unlikely to provide image content that is relevant to a local franchise. Thus, filtering out these types of homepages will help eliminate certain non-relevant image content. The filtering may be performed based on information provided by businesses to homepage mapping datastore 410 that is integrated with the system.

In step 404, webpages and their related pages (e.g., all pages under the domain of a remaining homepage) are retrieved for the filtered set of webpages from the web 412. In some implementations, certain heuristics may be applied to enhance the retrieving process. For example, webpages with filenames such as "gallery.html" or "pictures.html" may be determined to be highly relevant to image content, and thus extracted. These webpages, which have been determined to be relevant, may be fetched from servers on which they're hosted, or from a web index.

In step 406, image content may be extracted from the HyperText Markup Language (HTML) of the webpages. Image content may also be extracted from cascading style sheets (CSS) that reference the image content. Once extracted, one or more annotations may be generated for the image content based on certain characteristics of the extracted image content, such as the probability that the image content contains obscene material, whether the image content is a photo or a non-photo, whether the image content is black and white or color, the dimension and aspect ratio of the image content, etc. The annotation may be generated externally by image annotator 414.

The annotations are used in step 408 to narrow down the set of image content. A cascade of filters may be applied to the set of image content, where each of the filters considers a separate annotation. For example, a first filter may filter out image content that has a probability of containing obscene material exceeding a predetermined threshold; a second filter may filter out all non-photo image content; a third filter may filter out all black and white image content; and a fourth filter may filter out image content that is not within the range of acceptable aspect ratios. Once filtered, images may be selected in step 410. The selected images may be provided to a corresponding application that requested place-relevant image content for the particular business. Alternatively, the selected images may be provided to one of several pipelines into which image content is provided.

Figure 5:
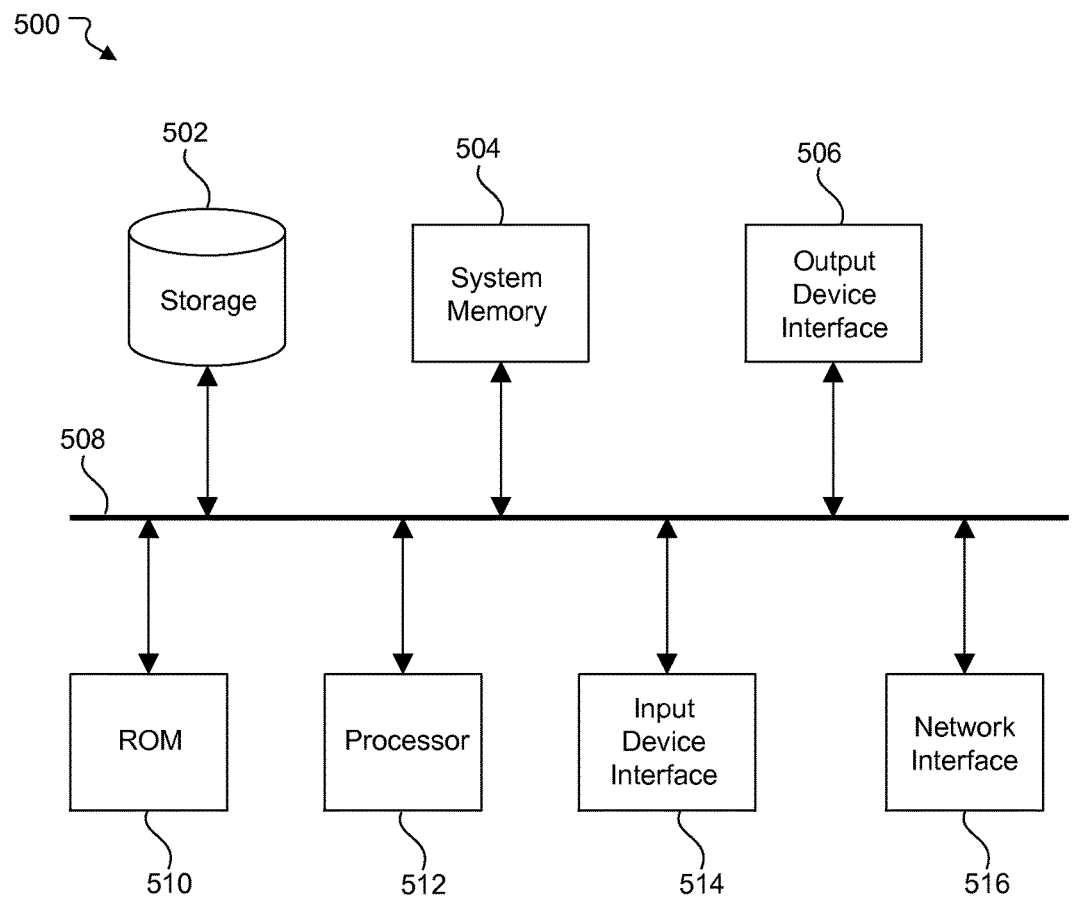
FIG. 5 conceptually illustrates an example electronic system with which some implementations of the subject technology are implemented.

FIG. 5 conceptually illustrates an example electronic system 500 with which some implementations of the subject technology are implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for extracting business-relevant image content from the web in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interface 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers, such as a local area network, a wide area network, or an Intranet, or a network of networks, such as the Internet. Any or all components of electronic system 500 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component. e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network and a wide area network, an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer-implemented method for providing image content corresponding to a business establishment, the method comprising:
   receiving, by one or more processors, a plurality of webpages corresponding to a business establishment, the webpages being filtered out from homepages of business establishments representing multiple locations;
   selecting, by the one or more processors, one or more webpages from the plurality of webpages belonging to and administered by the business establishment, based on content of each of the plurality of webpages;
   retrieving, by the one or more processors, at least one webpage related to the selected one or more webpages;
   extracting, by the one or more processors, image content from the retrieved at least one webpage;
   generating, by the one or more processors, at least one annotation for the extracted image content based on at least one characteristic of the extracted image content, the at least one annotation being associated with a probability that the at least one characteristic satisfies one or more criterion;
   filtering, by the one or more processors, the image content based on the generated at least one annotation for the extracted image content; and
   providing, by the one or more processors, the filtered image content for display in response to a search query for information relating to the business establishment;
   wherein the at least one characteristic of the extracted image content comprises at least one of a probability that the extracted image content is a photograph versus a graphical rendering, an indication of whether the extracted image content is black and white or color, or an indication of a relevance of a Uniform Resource Locator of the retrieved at least one webpage.

2. The computer-implemented method of claim 1, wherein selecting the one or more webpages from the plurality of webpages comprises:
   determining whether each of the plurality webpages is owned by the business establishment; and
   selecting the one or more webpages based on the determination.

3. The computer-implemented method of claim 1, wherein retrieving the at least one webpage related to the selected one or more webpages is based on at least one of a domain of the selected one or more webpages, a path name of the at least one webpage, or a number of clicks required to navigate to the at least one webpage from a root page of the domain, the number of clicks required being based on a web index of the domain.

4. The computer-implemented method of claim 1, wherein extracting the image content from the retrieved at least one webpage comprises at least one of extracting image files from HyperText Markup Language (HTML) corresponding to the at least one webpage or extracting image files from cascading style sheets (CSS) that reference the image content on the at least one webpage.

5. The computer-implemented method of claim 4, wherein extracting image files from the HTML corresponding to the at least one webpage further comprises identifying, based on a web index, image files in the HTML corresponding to the at least one webpage, and extracting the identified image files.

6. The computer-implemented method of claim 1, further comprising identifying physical dimensions of the extracted image content, wherein generating the at least one annotation for the extracted image content is further based on the physical dimensions of the extracted image content.

7. The computer-implemented method of claim 6, further comprising assigning scores to images of the extracted image content based on the at least one characteristic of the extracted image content.

8. The computer-implemented method of claim 7, wherein filtering the image content comprises selecting images with scores above a predetermined threshold value.

9. The computer-implemented method of claim 7, wherein filtering the image content comprises sorting the images based on the assigned score and selecting a predetermined number of images with highest scores.

10. The computer-implemented method of claim 1, further comprising producing a score for each image file of the extracted image content, wherein the score is produced according to each of the at least one characteristic of the extracted image content.

11. The computer-implemented method of claim 10, further comprising assigning weights to each different characteristic of the at least one characteristic.

12. The computer-implemented method of claim 1, wherein filtering the image content includes applying a cascade of filters to the extracted image content, each filter of the cascade considering a separate annotation.

13. A non-transitory machine-readable medium comprising instructions stored therein, which when executed by a system, cause the system to perform operations comprising:
identifying a domain corresponding to a business establishment, the domain being filtered out from domains of business establishments representing multiple locations;
retrieving at least one webpage related to the identified domain;
selecting a webpage from the at least one webpage belonging to and administered by the business establishment, based on content of the at least one webpage;
extracting image content from the selected webpage, the extracted image content comprising image files;
generating at least one annotation for the image files based on at least one characteristic of the image files, the at least one annotation being associated with a probability that the at least one characteristic satisfies one or more criterion;
determining scores for the image files based on the generated at least one annotation;
filtering the image files based on the determined scores of the image files; and
providing the filtered image files for display;
wherein the at least one characteristic of the extracted image content comprises at least one of a probability that the extracted image content is a photograph versus a graphical rendering, an indication of whether the extracted image content is black and white or color, or an indication of a relevance of a Uniform Resource Locator of the retrieved at least one webpage.

14. The non-transitory machine-readable medium of claim 13, wherein the domain corresponding to a business establishment comprises a domain determined to be owned by the business establishment, and wherein the domain is determined to be owned by the business establishment based on at least one of an indication provided by the business establishment or a probability analysis of a likelihood of the domain being owned by the business establishment indicated by a web index.

15. The non-transitory machine-readable medium of claim 13, wherein filtering the image files based on the determined scores of the image files comprises sorting the image files based on the assigned score and selecting a predetermined number of image files with highest scores.

16. A system for extracting business-relevant image content from the web, the system comprising:
one or more processors; and
a machine-readable medium comprising instructions stored therein, which when executed by the processors, cause the processors to perform operations comprising:
identifying a domain corresponding to a business establishment, the domain being filtered out from domains of business establishments representing multiple locations;
retrieving at least one webpage related to the identified domain;
selecting a webpage from the at least one webpage belonging to and administered by the business establishment, based on content of the at least one webpage;
extracting image content from the selected webpage, the extracted image content comprising image files;
generating at least one annotation for the image files based on at least one characteristic of the image files, the at least one annotation being associated with a probability that the at least one characteristic satisfies one or more criterion;
determining scores for the image files based on the generated at least one annotation;
sorting the image files based on the determined scores of the image files; and
providing a set of the image files for display based on the sorting of the image files;
wherein the at least one characteristic of the extracted image content comprises at least one of a probability that the extracted image content is a photograph versus a graphical rendering, an indication of whether the extracted image content is black and white or color, or an indication of a relevance of a Uniform Resource Locator of the retrieved at least one webpage.

17. The system of claim 16, wherein the instructions for providing the set of the image files for display based on the sorting of the image files comprises instruction for selecting a predetermined number of image files with highest scores and providing the selected image files for display.

* * * * *